Aug. 31, 1937.  C. W. STUMP, JR  2,091,380
COMBINED SUN VISOR AND WINDSHIELD HEATER
Filed Jan. 10, 1936  2 Sheets-Sheet 1
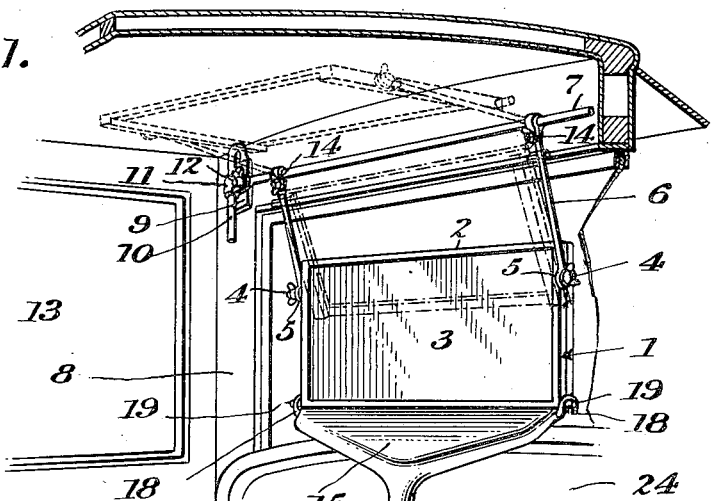
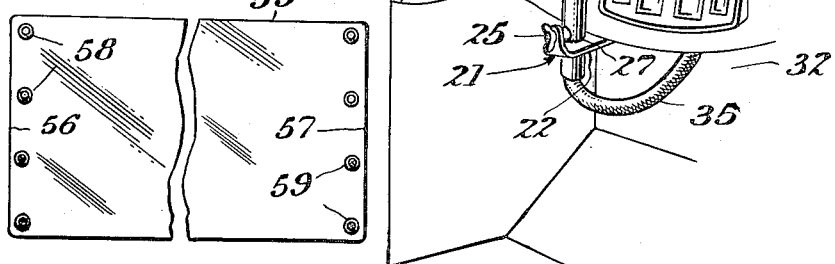
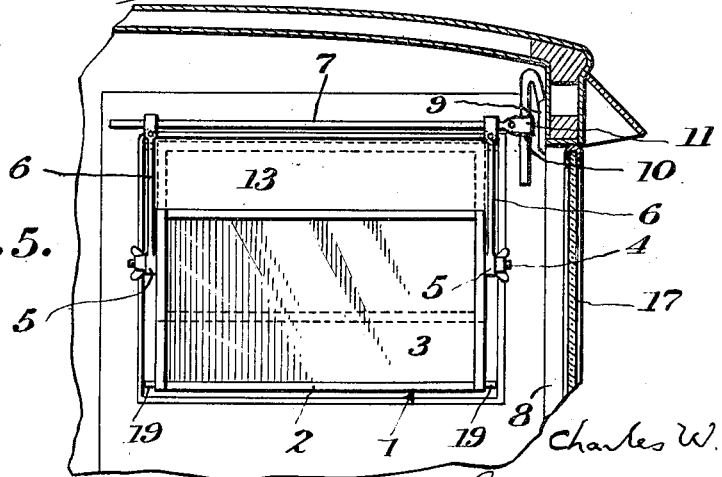

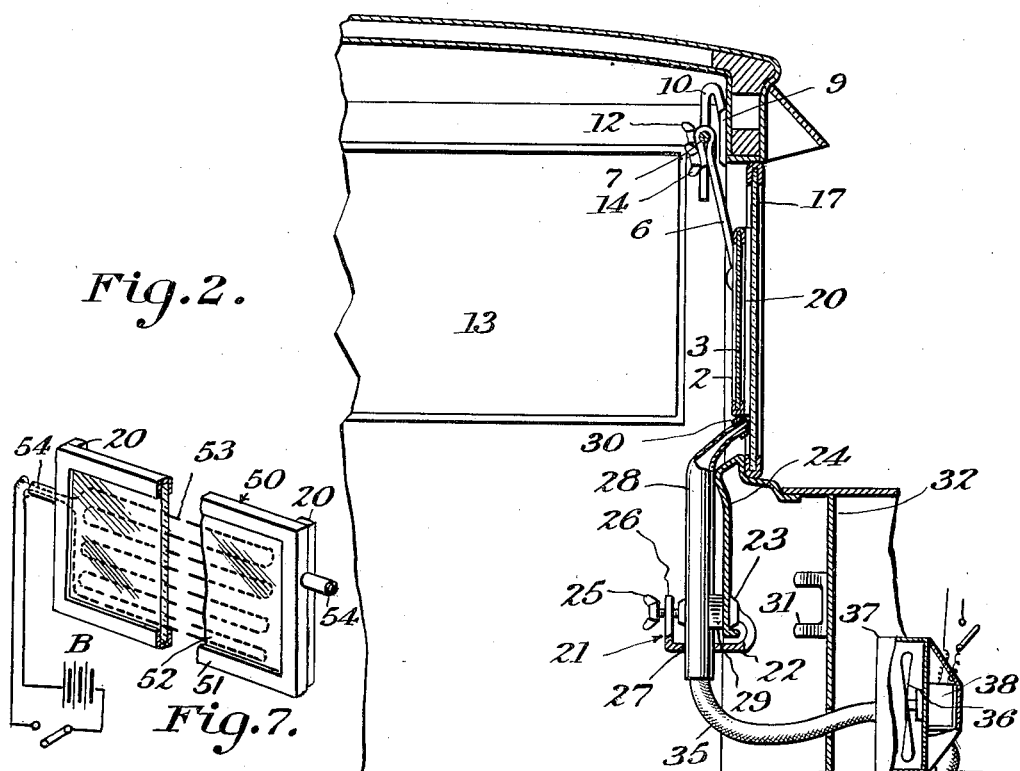
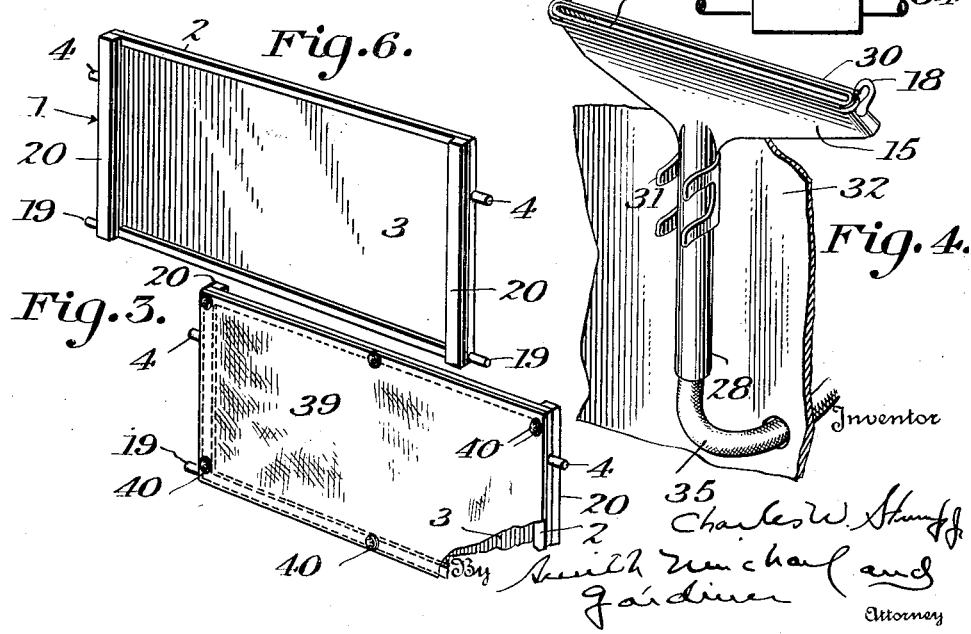

Patented Aug. 31, 1937

2,091,380

UNITED STATES PATENT OFFICE 2,091,380

COMBINED SUN VISOR AND WINDSHIELD HEATER

Charles W. Stump, Jr., Hagerstown, Md.

Application January 10, 1936, Serial No. 58,570

7 Claims. (Cl. 296—97)

This invention is a combined windshield heater and sun visor and is designed particularly for use in connection with motor vehicles, so that a single panel member may function selectively as a sun visor for protecting the eyes of the driver from the glaring rays of the sun when in one position, and as an essential element of a windshield heating device in another position.

The invention has for its object the provision of a sun visor of novel construction and arranged to selectively function as a means for protecting the eyes of the driver from the rays of the sun when in one position, and which visor is positionable to operatively engage means for directing and confining a heating fluid in operative engagement with respect to the windshield.

More particularly, the invention includes a sun visor having a panel member which may be operatively associated with the windshield or side window of a motor vehicle in which it is mounted so as to protect the driver from objectionable sun rays entering either at the front or side of the car, said sun visor including means for supporting a heating element in operative position with respect to the windshield pane.

The invention also contemplates novel means for rendering an adjustable transparent panel member, operative in one position for supporting a nozzle having connection with a source of heat and arranged for directing a heated fluid upon said windshield to prevent the formation of ice, frost and the like thereon, substantially opaque for use as a sun visor which may be adjustably positioned either in front of or at one side of the driver to protect the eyes of the driver against objectionable glare and the like.

The invention, having these objects in view, comprises a novel arrangement of windshield visor and heating means for a windshield of a motor vehicle which will be simple in construction, easy to mount and adjust within the vehicle, and which is readily adapted for mounting in all vehicles of conventional present day construction.

In the following specification and accompanying drawings I have described and illustrated preferred embodiments of my invention, but it is to be understood that these are for the purpose of illustration only, and that the important and novel features of my invention are set forth more clearly in the appended claims.

Referring to the accompanying drawings:

Figure 1 is a fragmental perspective view showing my invention attached to the forward part of a motor vehicle and in operative association with the windshield thereof.

Fig. 2 is a fragmentary sectional view of the device shown in Fig. 1.

Fig. 3 is a fragmentary perspective view showing novel means I propose for converting a substantially transparent panel into an opaque sun visor.

Fig. 4 is a fragmentary perspective view showing the manner in which the air nozzle of my improved heater is supported when not in use.

Fig. 5 is a fragmentary sectional view similar to that shown in Fig. 2 with the panel member of my invention operatively associated with the front side window of the vehicle.

Fig. 6 is a perspective view of the panel member of my sun visor showing the side thereof which contacts the windshield when used in the manner illustrated in Fig. 1.

Fig. 7 is a perspective detail view of a modified form of panel having an electric heating element associated therewith.

Fig. 8 discloses a modified form of a shield for rendering a transparent or semi-transparent panel opaque for use as a sun visor.

Referring more particularly to the accompanying drawings, wherein like numerals are used to designate like parts throughout, my invention comprises a sun visor having a panel member indicated generally by the reference character 1, and which, as shown in Fig. 6, comprises a suitable frame member 2 within which is mounted a semi-transparent panel 3 of sheet material such as colored glass or the like. The side or vertical members of the frame 2 are provided with suitable trunnions 4, said trunnions being engaged in suitable journals or eyes 5 provided in the lower extremities of a pair of arms 6, 6. The arms 6, 6 are adjustably mounted upon an overhanging arm or bracket member 7 adjustably mounted on a vertical pillar 8 of the vehicle by means of a bracket 9. The bracket 9 is provided with a suitable pintle 10 disposed in a substantially vertical position and said arm 7 is pivotally mounted upon the pintle 10 by means of a sleeve or bearing 11 slidable and rotatable upon the pintle 10. A suitable set screw 12 is carried by the bushing 11 for the purpose of maintaining a substantially snug frictional fit between the bushing 11 and the pintle 10 so that the rod or arm 7 may be retained at any desired degree of elevation while being permitted to rotate about a vertical axis from the position shown in Fig. 1 to the position shown in Fig. 5. By this construction and arrangement it is apparent that the panel member 1 forming the sun visor of my invention may be operatively positioned between the driver and the windshield or may be swung at right angles to such position to protect the driver from rays of sun entering the side window of the car, which window is indicated generally by the reference numeral 13.

It is to be noted that the trunnion members 4 of the panel member 1 are positioned adjacent the upper edge of the frame member 2, as shown in Fig. 6, and that the arms 6 by which the panel member 1 is supported from the overhead bracket 7, are dimensioned to permit the panel 1 to be completely rotated about the axis of the trunnions 4, this operation being indicated in dotted lines in Fig. 1. This feature of construction is of importance in that it permits the panel member 1, when used as a sun visor, to be swung into the position shown in dot-and-dash lines in Fig. 1, in which position it is in substantial alignment with the line of vision of the operator, and thus protects the operator's eyes from the glare of the sun when the same is positioned in front of the vehicle. The arms 6 are frictionally gripped to the overhead arm or bracket 7 by means of suitable set screws 14, 14. It will be understood that the members 14, 14 are adjusted to allow the arms 6, 6 to be swung about the rod 7 as an axis into any desired angular position with respect thereto, so that when desired the entire panel 1 and associated arms 6 may be positioned adjacent the roof of the vehicle, as shown in dotted lines in Fig. 1.

The windshield heating means which forms an essential part of my invention, comprises a nozzle member 15 designed when in use, to be operatively disposed with relation to the lower part of the windshield, as shown in Figs. 1 and 2, with its flaring discharge mouth 16 in close proximity to the windshield pane 17, as shown in Fig. 2. I provide alternative or dual means for supporting the nozzle in this position, one of said means including suitably fashioned hook members 18, there being one of said hook members disposed at each end of the nozzle, as shown in Fig. 4. These hook members are designed to cooperate with a pair of laterally extending pins 19 carried by the frame 2 of the panel member 1 and at the lower extremity thereof as shown in Fig. 6. Thus, when the panel member 1 is swung with respect to the arms 6 to the position shown in Fig. 1 in which it overlies that region of the windshield pane 17 disposed for the most part below the line of vision of the operator of the vehicle, said pin members 19 are arranged to operatively support the nozzle 15 by means of hooks 18 in a position such that fluid projected from the opening 16 of said nozzle impinges upon that portion of the windshield immediately underlying the panel 1. I further provide the frame member 2 on the side thereof which lies opposed to the windshield pane 17 in the position shown in Figs. 1 and 2, with suitable packing or bushing strips 20, as clearly shown in Fig. 6. These packing strips 20 may be made of rubber, felt or any other suitable means which may be secured to the vertical end frame members of the panel 1 in any desired manner. They function to properly space the semi-transparent sheet 3 of the panel 1 in substantial parallelism with the pane 17 of the windshield, so as to provide a well defined channel for the passage of heated fluid admitted by the nozzle 15, and also to prevent chattering of the panel member 1 against the windshield pane 17 due to vibration of the vehicle. In the position of the parts as shown in Figs. 1 and 2, the panel member 1 is retained in operative engagement with respect to the windshield 17 by the frictional engagement caused by the members 14, 14 carried by the arms 6, 6 and bearing on the overhanging rod or bracket 7. If desired, however, additional means may be provided for more securely retaining the nozzle 15 and the panel 1 in operative engagement with respect to each other and the windshield pane 17, and I have shown such additional means as a suitable clamp 21 in Figs. 1 and 2. The clamp 21 comprises a substantially U-shaped bracket member 22 provided with an abutment 23 designed to engage the rear face of the dashboard or instrument panel 24 of the vehicle, and arranged in opposition to the abutment 23, I provide an adjustable screw-threaded clamp member 25 disposed in an upstanding arm 26 arranged to lie in front of the panel member 24 with the parts arranged as shown in Fig. 2. The U-shaped member 22 may be suitably apertured as at 27 to receive the conduit 28, to the upper end of which is attached the flaring nozzle 15. If desired, a suitable bushing block 29 may be interposed between the conduit 28 and the front side of the panel 24 so that when the set screw 25 is tightened the conduit 28 is securely clamped to the panel 24 with its nozzle 15 in operative relation with respect to the windshield pane 17. If desired, a suitable sleeve 30 of cushioning material, such as rubber or the like, may be mounted in any suitable manner upon the nozzle 15 adjacent the top orifice 16 thereof to prevent injurious contact between the nozzle and the glass of the windshield. When the nozzle 15 is not being used, the clamp 21 may be released and said nozzle disposed beneath the dashboard panel 24 in any suitable manner, such as by means of a spring clamp 31 secured to the partition member 32. The arrangement of the nozzle in inoperative position is clearly shown in Fig. 4.

The nozzle 15 and conduit 28 thereof are arranged to receive a heated fluid such as air, from any suitable heating means. Preferably, I associate with the nozzle 15 a source of heat such as the heater 33 arranged to receive heat from some portion of the vehicle motor such as the water circulating system or exhaust pipe thereof, such as indicated at 34, said heater having communication with the nozzle 15 and conduit 28 by means of suitable flexible tubing 35. If desired, the tubing 35 intermediate its point of connection with the heater 33 and the nozzle 15, may be provided with any suitable means for increasing the normal velocity of flow thereof, such as a suitable fan member 36 mounted within a housing 37, the latter having communication with the heater 33 and the nozzle 15 by means of the flexible tubing 35. The fan 36 may be driven by a suitable electric motor 38 from the battery of the vehicle, not shown.

In the foregoing description of my invention I have described the panel member 1 as comprising a semi-transparent sheet material 3, the latter functioning in the capacity of an anti-glare material to break the rays of sun or of the headlights of approaching vehicles, it being appreciated that the material thus chosen for the windshield visor will also function when the panel member 1 is disposed in the manner shown in full lines in Fig. 1 to confine the heated fluid discharged from the nozzle 15 without offering any serious difficulty to the driver by way of obstructing the vision. However, it may be desirable in some instances to provide a panel member 1 having a sheet of substantially transparent material so that the driver will have a clear view of the road through said transparent panel when the same is being used in connection with the heater nozzle 15. In this instance it is obvious that some means must be provided for rendering the panel substantially opaque when it is desired to use the same as a sun visor, and with this in mind I show in Fig. 3 means for converting a completely transparent panel or semi-transparent panel 3 into a substantially opaque panel, said means comprising a flexible sheet of opaque material 39 such as cloth, leather or any other opaque flexible sheet material, fabric, or the like, said sheet being dimensioned to completely cover the sheet 3 and arranged to be secured to the frame member 2 of the panel by any suitable means such as head and socket fasteners, indicated generally at 40, it being understood that the frame member 2 is suitably provided with one element of the separable fastener, such as the head, whereas the socket portion of the fastener may be conveniently carried in any suitable manner by the flexible sheet material 39. It is at once apparent that by attaching the sheet member 39 to the frame 2, as shown in Fig. 3, the panel 1 is at once rendered substantially opaque so that it can be readily used in the capacity of a sun visor. If and when it is desired to use the panel 1 as an element of the windshield heating device, the sheet 39 is readily detached from the frame so that a substantially transparent or semi-transparent panel 3 is uncovered to clear the line of vision of the operator.

Having thus described my invention, it is at once apparent that I have provided a novel form of sun visor arranged for use in all respects similar to conventional sun visors but having the additional desirable advantage of being capable of association with a windshield in a manner such that it functions as an essential element of a windshield heating device. More particularly, the sun visor of my invention is arranged to support a nozzle in operative relation with respect to the windshield for the purpose of directing and confining a heated fluid emitted from said nozzle into operative engagement with a predetermined area of the windshield to prevent the formation of frost and ice thereon.

It will be understood that my invention contemplates means other than the specific arrangement shown in Figs. 1 and 2 for heating the windshield pane 17 and is adapted particularly to employ the conventional electrically heated auxiliary panel such as is widely used at the present time for heating windshields, and in the general arrangement thereof is secured to the windshield pane by means of suction cups and the like. Thus, in Fig. 7 I have shown a panel member 50 comprising a frame 51 surrounding a sheet of transparent material 52 such as glass or the like, and in which is embedded or has otherwise operatively associated therewith, an electric heating element 53. In the arrangement shown the lead wires for the heating element may be conveniently entered through one of the pintle or journal members 54 by which the panel is pivotally supported from the arms 6 of Figs. 1 and 2, it being noted in this arrangement that one or both of said journal members 54 is hollow to permit entrance of said lead wires. As is conventional in use of windshield heaters of this type, the lead wires are connected through a suitable switch to the vehicle battery indicated generally by the reference character B.

In Fig. 8 I have illustrated a modified form of opaque shield for the panel 1 of Figs. 1 and 2 or the panel 50 of Fig. 7, the shield in this instance comprising a band or strip 55 of opaque flexible material such as cloth, leather or the like of a width sufficient to completely cover the panel member from end to end thereof, and of a length sufficient to completely encompass said panel member in contradistinction to overlying one side thereof only, as shown in Fig. 3. Thus, the shield strip of Fig. 8 is provided on opposite end portions thereof 56 and 57, with conventional separable fasteners 58 and 59 of the head and socket type similar in all respects to the conventional glove fastener.

Having thus described the invention what I claim is:

1. In a vehicle including a windshield, the combination with said windshield of means for heating the same, and a sun visor separate and distinct from the heating means adjustably mounted with respect to the windshield and means for selectively positioning the visor with respect to said windshield, said faces including a translucent portion which lies in the line of vision of the operator of the vehicle in all operative positions of adjustment, said sun visor in one position cooperating with said heating means to direct the heat from said heater over a predetermined area of the windshield.

2. In a vehicle including a windshield, the combination with said windshield of means for heating the same and a sun visor separate and distinct from said heating means including a panel member adjustably mounted with respect to the windshield and means for selectively positioning the panel with respect to the windshield, said panel including a translucent portion which lies in the line of vision of the operator of the vehicle in all operative positions of adjustment, said panel member in one position cooperating with said heating means to direct the heat from said heater upwardly over a predetermined area of the windshield.

3. In a vehicle including a windshield, a sun visor, and means for adjustably mounting the sun visor with respect to the windshield, said sun visor including a translucent portion which lies in the line of vision of the operator in all operative positions of adjustment, means separate and distinct from the sun visor for heating the windshield including a nozzle member, and means carried by the sun visor operative in one position of the visor for supporting said nozzle in operative relation with respect to the windshield.

4. In a vehicle including a windshield, a sun visor including a translucent panel, and means for adjustably mounting the panel with respect to the windshield and in the line of vision of the operator, means for heating the windshield including a nozzle member, and means carried by the sun visor operative in one direction of the panel for supporting said nozzle in operative relation with respect to the windshield, and additional means for securing the sun visor and nozzle supported thereby in firm engagement with the windshield.

5. In a vehicle including a windshield, means for heating the windshield including a nozzle, and means for disposing the nozzle to discharge a heated fluid upon the lower portion of the windshield, a sun visor separate and distinct from the heating means and including a translucent panel member adjustably mounted with respect to the windshield and means for selectively positioning the panel adjacent the upper or lower portions of the windshield and in the line of vision of the operator, and means carried by said panel for supporting said nozzle, said panel member being provided with cushioning strips arranged to maintain the panel member in spaced relation with respect to the windshield, and means for maintaining the panel in contact with the windshield to define a channel within which fluid discharged from the nozzle is directed.

6. A combined sun visor and heater support for automobile windshields comprising a bracket construction designed to be supported from the upper frame of the windshield, a panel member pivotally supported from said bracket construction, said panel member including a translucent pane pivoted at its ends at points intermediate its horizontal edges and nearer one edge than the other, whereby said pane may be disposed adjacent the upper or lower portions of the windshield with a portion thereof in either position in the line of vision of the operator, and means carried by the panel adjacent the horizontal edge thereof remote from said pivot for supporting a windshield heater element.

7. In a vehicle including a windshield, the combination with said windshield of means for heating the same including a nozzle positionable adjacent to said windshield to discharge a heated fluid thereon, and means in communication with said nozzle for supplying the heated fluid thereto, and a sun visor separate and distinct from the heating means and including a translucent panel adjustably mounted with respect to the windshield and means for selectively positioning said panel with respect to the windshield, said panel including a translucent portion which lies in the line of vision of the operator of the vehicle in all operative positions of adjustment, said sun visor being provided with nozzle supporting means which in one position of the visor engage said nozzle to support the same in operative position with respect to the windshield.

CHARLES W. STUMP, JR.